United States Patent [19]

Miyamoto et al.

[11] Patent Number: 4,862,440
[45] Date of Patent: Aug. 29, 1989

[54] OPTICAL HEAD WITH OPTICAL BEAM CONTROL USING ACOUSTIC WAVE DEVICE

[75] Inventors: Norifumi Miyamoto; Yoshio Sato, both of Hitachi; Nobuyoshi Tsuboi, Ibaraki; Satoshi Shimada, Hitachi; Hiroshi Sasaki, Hitachi; Hiroaki Koyanagi, Hitachi; Hiroyuki Minemura, Hitachi, all of Japan

[73] Assignee: Hitachi, Ltd., Tokyo, Japan

[21] Appl. No.: 98,969

[22] Filed: Sep. 9, 1987

[30] Foreign Application Priority Data

Sep. 9, 1986 [JP] Japan .................. 61-212312

[51] Int. Cl.⁴ .............................. G11B 7/00
[52] U.S. Cl. ..................... 369/45; 250/201; 369/112
[58] Field of Search .............. 358/342; 369/43–47, 369/112, 121; 250/201 DF

[56] References Cited

U.S. PATENT DOCUMENTS

| | | | |
|---|---|---|---|
| 4,718,052 | 1/1988 | Kondo et al. | 369/112 X |
| 4,720,824 | 1/1988 | Hayashi | 369/112 X |
| 4,747,090 | 5/1988 | Yamashita et al. | 369/112 X |
| 4,760,568 | 7/1988 | Hine | 369/112 X |
| 4,779,259 | 10/1988 | Kono et al. | 369/112 |

FOREIGN PATENT DOCUMENTS 59-107431  6/1984  Japan .

*Primary Examiner*—Robert L. Richardson
*Attorney, Agent, or Firm*—Antonelli, Terry & Wands

[57] ABSTRACT

An optical head is disclosed, in which a plate-shaped optical wave guide comprises an optical system including a collimator lens, a beam splitter and an objective lens; a laser light source for emitting a laser light in the form of a light beam which is to be impinged on an optical recording medium; and electro-acoustic transducers are disposed between the beam splitter and the objective lens, the transducers being adapted to be driven by the outer electrical signal for producing surface acoustic waves in the optical wave guide, thereby establishing a condensation and rarefaction distribution in refractive index in the optical wave guide which distribution influences the direction of transmission and the degree of focusing of the light beam passing therethrough so that regulation of the tracking and the focal length can be effected without any mechanical movements.

11 Claims, 9 Drawing Sheets

REFRACTIVE
INDEX
INCREASING

OPTICAL HEAD WITH OPTICAL BEAM CONTROL USING ACOUSTIC WAVE DEVICE

BACKGROUND OF THE INVENTION

This invention relates to an optical head for recording, reproduction and erasing used in an optical disk memory system and in particular to an optical head using a thin film optical wave guide.

As the post-industrialization progresses, the amount of information treated in the society is surely increasing. For this reason the request to increase the memory capacity of the information recording device storing this information becomes progressively stronger. As a system for recording or reproducing various sorts of information those utilizing a magnetic method or an optical method are used in practice. However, among them, an optical disk system utilizing an optical disk as a memory medium permits storage of information with a density, which is more than 100 times as high as that of a prior art system utilizing a magnetic medium, and on the other hand it has an excellent feature that high quality reproduced signals can be obtained without any contact. Video disk, digital audio disk, etc. are known as memory systems utilizing such an optical recording medium.

FIG. 1 illustrates the basic construction of an optical head used in these systems. In the figure a laser light beam emitted by a semiconductor laser device 1 is transformed into a parallel light beam by a collimator lens 2 and goes straight on through a beam splitter 3. It passes further through a ¼ wave plate 4 and an objective lens 5 and is focused on an optical disk 6 so as to form a light spot 7. This light spot 7 is reflected by the optical disk 6 and passes again through the objective lens 5 and the ¼ wave plate 4. Then it passes through cylindrical lenses 8 and 9 after having been reflected to the right angle by the beam splitter 3, which is a half mirror, and is focused on an optical sensor 10. This optical sensor 10 detects the focusing and the tracking information of the objective lens 5 and the presence or absence of the record on the disk.

In such an optical system it was necessary to regulate the position of each of the optical parts so that the light spot is focused on the optical disk 6 and the optical sensor 10. There was a problem that the regulation necessitated a long time. Further there was another problem that the reduction of the size of the optical head was limited.

Since the reduction of the size of the optical head contributes considerably to the reduction of the size of the whole optical disk system and to the increase of the reliability, research and development therefor are at present widely promoted. As a proposal for the reduction of the size and the weight of an optical head, that disclosed by JP-A-60-202553 is known. According to this proposal, indicated in FIG. 2, an optical wave guide 12 is formed by diffusing titanium into a surface portion several microns thick of a substrate 11 made of lithium niobate ($LiNbO_3$) and a laser light beam emitted by a semiconductor laser device 13 is projected to one end surface of this optical wave guide 12. Then a light spot 16 is formed by focusing it on the other end surface of the optical wave guide 12 by means of refractive index distribution type lenses 14 and 15.

This kind of techniques is summarized in the following lierature; T. SUHARA et al., "Integrated Optics Components and Devices Using Periodic Structures" IEEE J. of Quantum Electronics pp. 845–867, 1986.

Since, in the prior art techniques, no attention was paid to the light spot actuate techniques, i.e. autofocusing and autotracking, in order to realize these functions, the practice was to locate the whole optical head on a coil actuator, etc. and to move it forward and backward toward left and right. For this reason there was a problem that the construction was complicated and that the reliability of the autofocusing and the autotracking was low.

SUMMARY OF THE INVENTION

The object of this invention is to provide an optical head using a thin film optical wave guide, which is small and light and for which autofocusing and autotracking of the light spot are possible.

In order to achieve the object described above, according to this invention, a thin film optical wave guide type optical head comprising an optical system consisting of a collimetor lens, a beam splitter and an objective lens formed in the plate-shaped optical wave guide and a laser light source projecting a laser light beam to this optical system, wherein recording, reproduction and erasing of information are effected by focusing and projecting the laser light beam stated above on an optical recording medium through the optical system described above. The invention may comprise further a lens located in the proximity of the objective lens, whose focal distance can be varied by a signal supplied from the exterior.

According to the construction described above, since it is possible to vary the focal point of the optical system as well as the refractive index distribution by varying the refractive index of the lens located in the proximity of the objective lens by a signal supplied from the exterior and by varying the magnitude of the refractive index in the optical wave guide, autofocusing and autotracking of the light beam can be effected without any mechanical operation.

DESCRIPTION OF THE PREFERRED EMBODIMENTS

Hereinbelow some embodiments of the optical head according to this invention will be explained with reference to the drawings.

Figure 1:
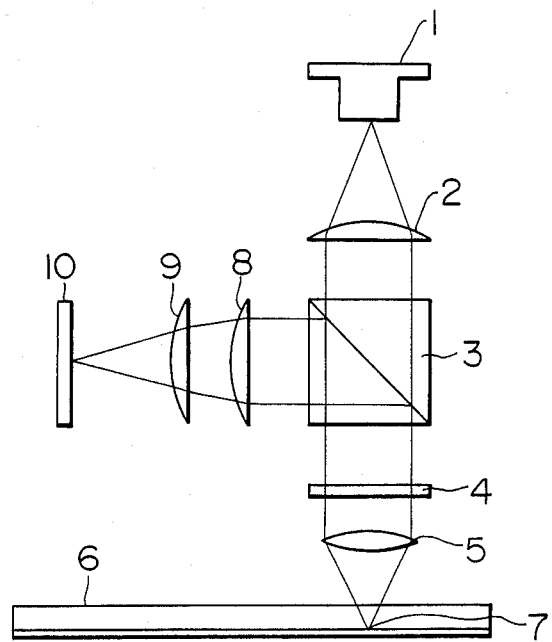
FIG. 1 is a scheme illustrating the construction of a prior art optical head.
Figure 2:
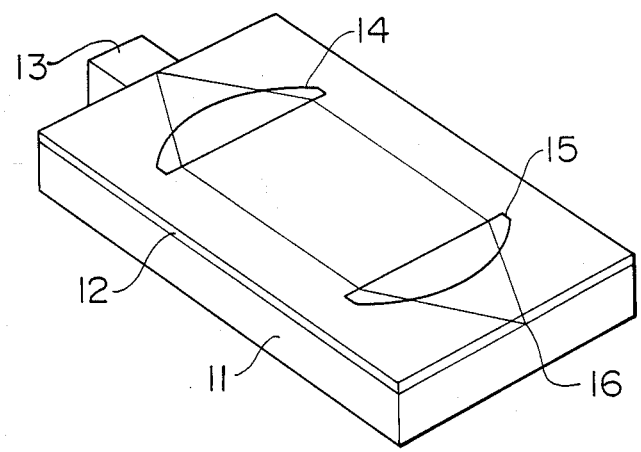
FIG. 2 is a perspective view showing a prior art optical wave guide type optical head.
Figure 3:
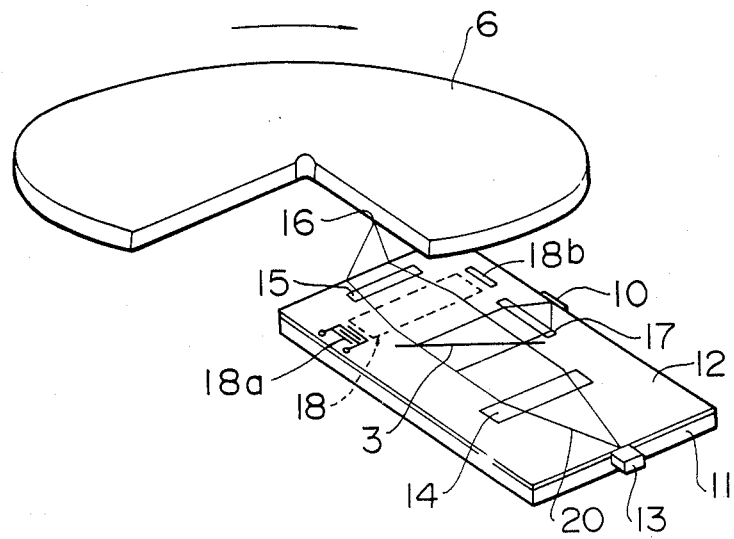
FIG. 3 is a perspective view illustrating an embodiment of the optical head according to this invention.

FIG. 3 shows an embodiment of this invention, in which the reference numerals used also in FIG. 1 or 2 represent same or corresponding items in the prior art device indicated therein. In FIG. 3, an optical wave guide 12 is formed by diffusing titanium in a surface portion several microns thick of a substrate 11 made of lithium niobate ($LiNbO_3$). The optical wave guide may be made of various materials other than those indicated above. The materials used therefor can be divided into two groups, one being inorganic and the other organic. The representative inorganic materials are lithium niobate ($LiNbO_3$), glass etc. The optical wave guide is formed by doping one of these materials with ions. (Table 1)

Various sorts of organic material may be used therefor. An optical wave guide is fabricated by applying one of them by spin coating, sputtering, etc. on an inorganic substrate such as glass, $SiO_2$, etc. (Table 2)

TABLE 1

Examples of the inorganic optical wave guide

| material | refractive index | fabrication method of optical wave guide | dopant | variation in refractive index | loss in light transmission [dB/cm] | field of* utilization |
|---|---|---|---|---|---|---|
| glass soda glass silicoborate glass | 1.47~1.57 | thermal ion exchange electric field ion exchange ion implantation | $K^+$, $Ag^+$, $Tl^+$  $He^+$, $Li^+$, $Tl^+$ | 0.01~0.1  0.002~0.05 | 0.2~5  1  ~0.2 | PC,TO |
| $LiNbO_3$ | $N_o = 2.286$  $n_e = 2.200$ | outer diffusion  inner diffusion  proton exchange (electric field) | ($LiO_2$: outer diffusion)  $T_1$ (Ni, Cu)  $H^+$  Cu (Nb) | $\geq 0.01$ $^b$  0.005~0.03$^a$  0.13$^b$  ~0.01$^a$ | ~1  $\geq 1$  ~1  ~2 | EO. AO.PC  EO. AO. PC |
| $LiTaO_3$ | $n_o = 2.176$  $n_e = 2.180$ | inner diffusion  proton exchange | $H^+$ | ~0.02$^b$ | 1~3 | |

TABLE 2

Examples of the organic optical wave guide

| material of optical wave guide film | substrate | light wavelength region | refractive index of optical wave guide film | fabrication method | loss in light transmission [dB/cm] | field of utilization* |
|---|---|---|---|---|---|---|
| organic polymer, PMMA polystyrene, etc. | glass | visible– near infrared | ~1.5 | spin coating polymerisation | $\geq 1$ | PC |
| glass corning #7059, etc. | glass $SiO_2/Si$, etc. | visible— near infrared | ~1.55 | sputtering CVD | $\geq 0.01$ | PC, AO |
| amorphous calcogenide As-S, As-Se-S-Ge, etc. | glass $SiO_2/Si$, etc. | near infrared | ~2.4 | vacuum evaporation sputtering | $\geq 0.4$ | PC, AO |
| $Ta_2O_5$ $Nb_2O_3$ | glass $SiO_2/Si$, etc. | visible— near infrared | 1.9~2.2 2.1~2.3 | metal thermal oxidation reactive sputtering | $\geq 0.5$ | PC,AO |
| $Si_3N_4$ ($SiO_xN_y$) | $SiO_2/Si$ | visible— near infrared | 1.9~2.0 | LPCVD PCVD | $\geq 0.1$ $\geq 1$ | PC, AO |
| ZnO c-axis oriented film monocrystal | glass $SiO_2/Si$ sapphire | visible— near infrared | $n_o = 1.98$ $n_e = 2.00$ | sputtering sputtering, CVD | $\geq 0.01$ | AO |
| PLZT (monocrystal) | sapphire | visible— near infrared | ~2.6 | sputtering | $\geq 3$ | EO |
| YIG (monocrystal) | GGG | near infrared | 2.17~2.23 | LPE, VPE sputtering | 1~10 | MO |

* PC: passive element, EO: opto-electronic element, AO: opto-acoustic element, TO: thermo-optic element
$^a$both $n_o$ and $n_e$ vary,
$^b$only $n_e$ varies.

On the other hand, geodesic lenses disposed in a recess portion formed in the form of a circle on the optical wave guide 12, mode index type lenses represented by a refractive index distribution type lens, in which the refractive index is distributed by implanting ions therein, Fresnel lenses using diffraction, grating lenses may be used for the collimeter lens 14, the objective lens 15 and the photosensor lens 17. In this embodiment a geodesic lens having a focal length of 6.5 mm is formed by a recess about 0.2 mm deep having a diameter of 7.6 mm. Concerning the geodesic lens, refer to e.g. the following article; S. Sottini et al. "Geodesic optics; new components", J. Opt. Soc. Am., pp. 1230-1234, 1980, which is hereby incorporated by reference.

Then the beam splitter 3 can be constructed by forming low grooves or ridges on the surface of the optical wave guide and a part of the light in the optical wave guide is reflected, the other part being transmitted. Their ratio can be varied by varying the depth of the grooves or the height of the ridges. Refer to e.g. W. T. Tsang, et al. "Thin-film beam splitter and reflector for optical guided waves", Applied Physics Letters, pp. 588-590, 1970, which is hereby incorporated by reference.

On the other hand the semiconductor laser (GaAs) 13 and the photosensor (semiconductor sensor) 10 are disposed on two end surfaces of the optical wave guide 12, respectively, which intersect perpendicularly to each other.

Further the end surface of the optical wave guide 12 on the side, where the objective lens 15 is disposed, is inclined with an angle of about 45° with respect to the upper surface so that the light beam leaving the objective lens 15 is totally reflected by the inclined surface (the same principle as that of the prism) and directed to the optical disk 6, as indicated in FIG. 3.

A surface acoustic wave device 18, which is a feature of this embodiment, is formed on the optical wave guide 12 between the beam splitter 3 and the objective lens 15. An electro-acoustic transducer (interdigital electrodes) 18a is buried and adhered at one end thereof and an ultra-sonic reflector (a reflecting electrode) 18b at the other end.

In this embodiment, since the optical wave guide 12 is made of lithium niobate ($LiNbO_3$), which itself has a piezo-electric effect, the electro-acoustic transducer 18a can be constructed only by the interdigital electrodes. However, in the case where the optical wave guide 12 is made of a substance such as glass, $As_2S_3$, etc., which itself has no piezo-electric effect, the electro-acoustic transducer 18a is constructed by a combination of the interdigital electrodes with a ZnO thin film, which itself has a piezo-electric effect.

Further, although a usual reflector is used as the ultra-sonic reflector 18b in this embodiment, it is also possible to use a reflector having a construction similar to that of the electro-acoustic transducer 18a. However, in this case, it is necessary to regulate suitably the phase of the voltage applied to the two transducers.

Now the operation and the effect of this embodiment will be explained. The light beam emitted by the semiconductor laser 13 is transformed into a parallel light beam by the collimator lens 14, which passes through the beam splitter 3. The position of the focusing and the position of the beam are controlled by the surface acoustic wave device 18 and the objective lens 15. Then the light beam is reflected by the inclined end surface of the optical wave guide 12 and forms the light spot 16 on the optical disk 6. Further the light reflected by the optical disk 6 passes again through the objective lens 15 and the surface acoustic wave device 18 and is reflected approximately at the right angle by the beam splitter 3. Then the beam passes through the lens 17 and is finally focused on the photosensor 10. This photosensor 10 detects the state of focusing of the light spot 7, the tracking state and presence or absence of information.

Then it will be explained how it is possible to regulate the position of the light spot 7, i.e. to regulate the tracking and the focal length by means of the surface acoustic wave device 18, referring to FIGS. 4a, 4b, 5a and 5b.

Figure 4A:
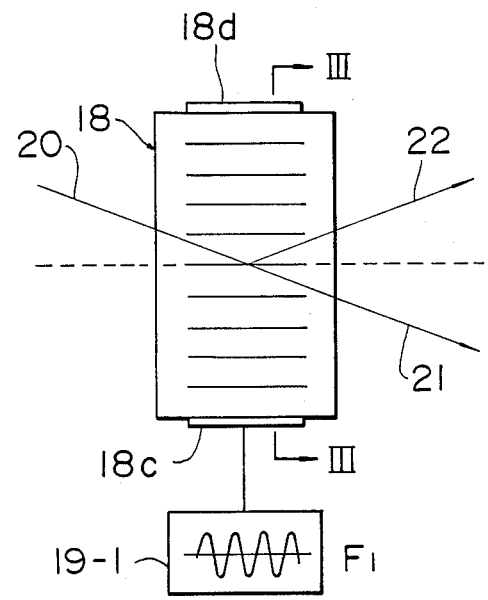
FIGS. 4a, 4b, 5a and 5b are diagrams for explaining the operation of a surface acoustic wave device in FIG. 3.
Figure 4B:
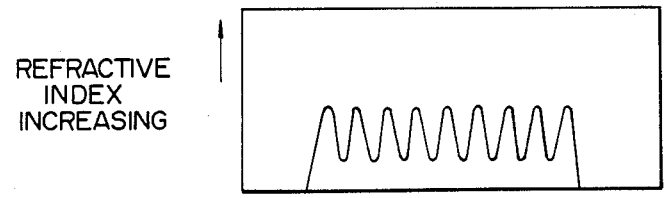

At first, referring to FIG. 4a, it will be explained how it is possible to regulate the tracking. When an ultrasonic wave (frequency $F_1$) is applied to the surface acoustic wave device 18, at each of the two ends where the electro-acoustic transducer 18a and the reflector 18b are disposed, respectively, by an ultra-sonic voltage source 19-1, ultra-sonic standing waves are produced within the surface acoustic wave device 18. At this time, when observed in the cross-section along the line III—III in FIG. 4a, the refractive index is distributed in the surface acoustic wave device, as indicated in FIG. 4b. In case the difference between distances from two adjacent loops in the refractive index to a certain point in space is comparable with the wavelength, such a refractive index distribution acts similarly to a diffraction grating. When a laser light beam 20 is projected to this surface acoustic wave device, this laser light beam 20 is divided into the 0-th order diffracted light 21, which goes straight on, and the 1st order diffracted light 22. At this time, since the refractive angle of the 1st order diffracted light 22 can be varied by varying the frequency of the ultra-sonic vibration applied to the surface acoustic wave device, it is possible to regulate the tracking of the light spot by using this 1st order diffracted light 22. The refractive angle used in practice is smaller than 1°. In addition, the intensity of the 1st order diffracted light 22 can be varied by varying the amplitude of the ultra-sonic vibration. Since there are no mechanical actions in these operations, the optical head according to this invention can be operated with a high reliability and with a short response time.

Figure 5A:
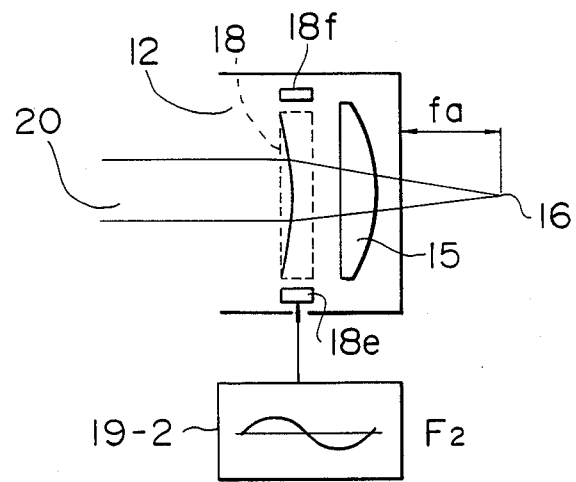
Figure 5B:
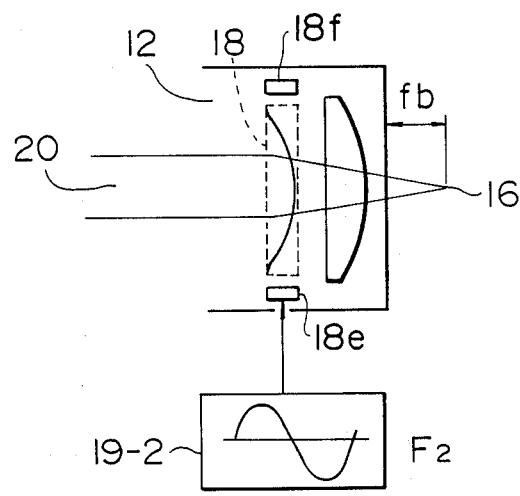

Now it will be explained how it is possible to regulate the focal length referring to FIGS. 5a and 5b. In this case an ultra-sonic vibration having a frequency $F_2$, whose half period is just equal to the total length of the surface acoustic wave device 18, is applied thereto. Then in the surface acoustic wave device 18 is produced a standing wave having a waveform corresponding to a half period of a since curve indicated in FIGS. 5a and 5b. In this way the refractive index distribution has a form corresponding to the waveform of this standing wave. Consequently the surface acoustic wave device having such a refractive index distribution acts on the light beam pasing therethrough similarly to a convex lens. When the amplitude of the applied voltage is small as indicated in FIG. 5a, the surface acoustic wave device 18 acts as a lens having a long focal length, and when the amplitude is great as indicated in FIG. 5a, it acts as a lens having a short focal length. In this way, by means of the device as explained above, it is possible to control the focal length without any mechanical operation by varying the amplitude of the applied ultra-sonic wave voltage.

Figure 6:
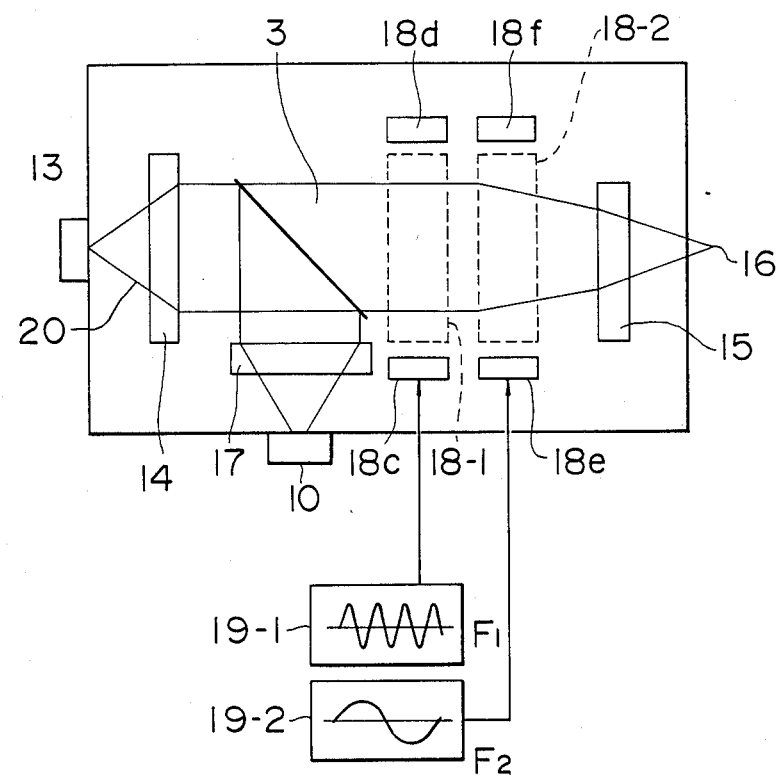
FIG. 6 is a view illustrating another embodiment.

Therefore, as indicated in FIG. 6, if there are disposed a surface acoustic wave device 18-1 (refer to FIGS. 4a and 4b), which can vary the refractive angle of the light beam passing therethrough by using the frequency $F_1$, and a surface acoustic wave device 18-2 (refer to FIGS. 5a and 5b), which can vary the focal length for the light beam passing therethrough by varying the voltage of the vibration having a frequency $F_2$, it is possible to effect the regulation of the tracking and the focal point of the light spot without any mechanical operation. Since the 1st order diffracted light is used for the regulation of the tracking, the incident angle and exiting angle of the light beam to and from the surface acoustic wave devices are somewhat different in practice.

Since the velocity of sound in lithium niobate (LiNbO$_3$) is $6.57 \times 10^3$ m/s, an ultra-sonic vibration of about several hundreds MHz may be used for $F_1$ and taking into account that the total length of the surface acoustic wave device 18 is about 10 mm, an ultra-sonic vibration of about 300–400 kHz may be used for $F_2$.

Figure 7:
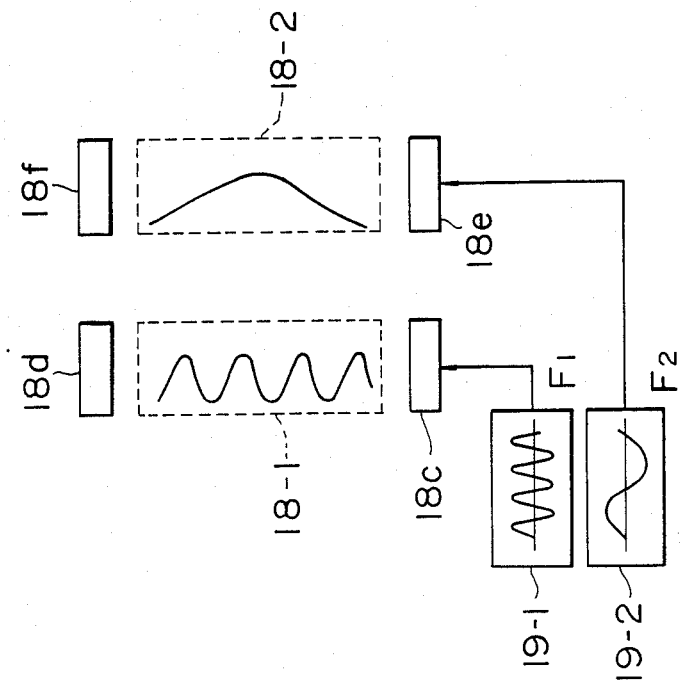
FIG. 7 is a diagram for explaining the operation of the embodiment indicated in FIG. 6.

Next FIG. 7 shows the operation of the embodiment indicated in FIG. 6. At first, when an ultra-sonic vibration (frequency $F_1$) coming from an ultra-sonic wave source 19-1 is applied to an electro-acoustic transducer 18c of the surface acoustic wave device 18-1, grating-shaped standing waves and consequently a grating-shaped refractive index distribution as indicated in the figure are produced between the transducer 18c an ultra-sonic reflector 18d in the surface acoustic wave device 18-1. In this case the refractive angle of the 1st order diffracted light of the light beam 20 can be varied by varying the frequency $F_1$ and in this way the tracking regulation of the light spot 16 can be effected.

On the other hand, when a signal (frequency $F_2$) coming from an ultra-sonic wave source 19-2 is applied to another electro-acoustic transducer 18e of the other surface acoustic wave device 18-2, a standing wave of a half period of a frequency $F_2$ is produced, as indicated in the figure, in a surface acoustic wave device 18-2, which gives rise to a refractive index distribution having a same waveform as that of the standing wave. In this way the refractive index of the lens for the light beam 20 can be varied by varying the amplitude of the ultra-sonic vibration coming from the ultra-sonic wave source 19-2 and in this way the focal point regulation of the light spot 16 can be effected.

Further, the grating-shaped refractive index distribution produced in the surface acoustic wave device 18-1 can be generated, apart from a standing wave, by a travelling wave of the same ultra-sonic wave. In this case, the ultra-sonic reflector 18d is replaced by an ultra-sonic absorber.

Figure 8:
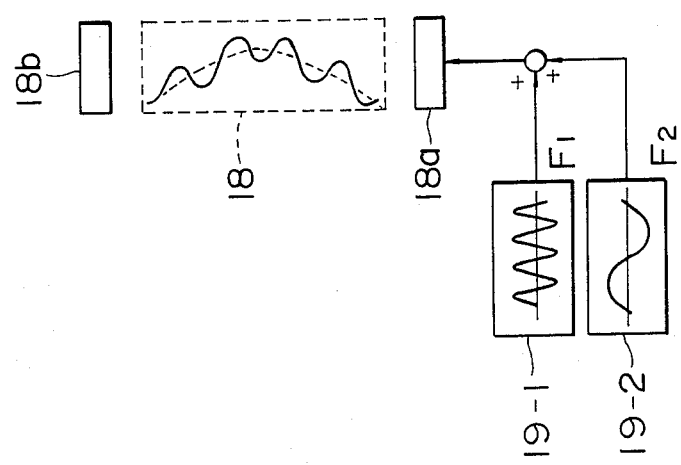
FIG. 8 is a diagram for explaining the operation of the embodiment indicated in FIG. 3.

The surface acoustic wave device for regulating the tracking and the surface acoustic wave device for effecting the focusing regulation are not necessarily disposed separately, as indicated in FIGS. 6 and 7, but they can be united, as indicated in FIG. 8. The whole structure of this device is illustrated previously as an embodiment in FIG. 3. In this case the standing wave produced in the surface acoustic wave device 18 is such one as the grating-shaped waves of the frequency $F_1$ are superposed on a half period of the wave of the frequency $F_2$.

Figure 9A:
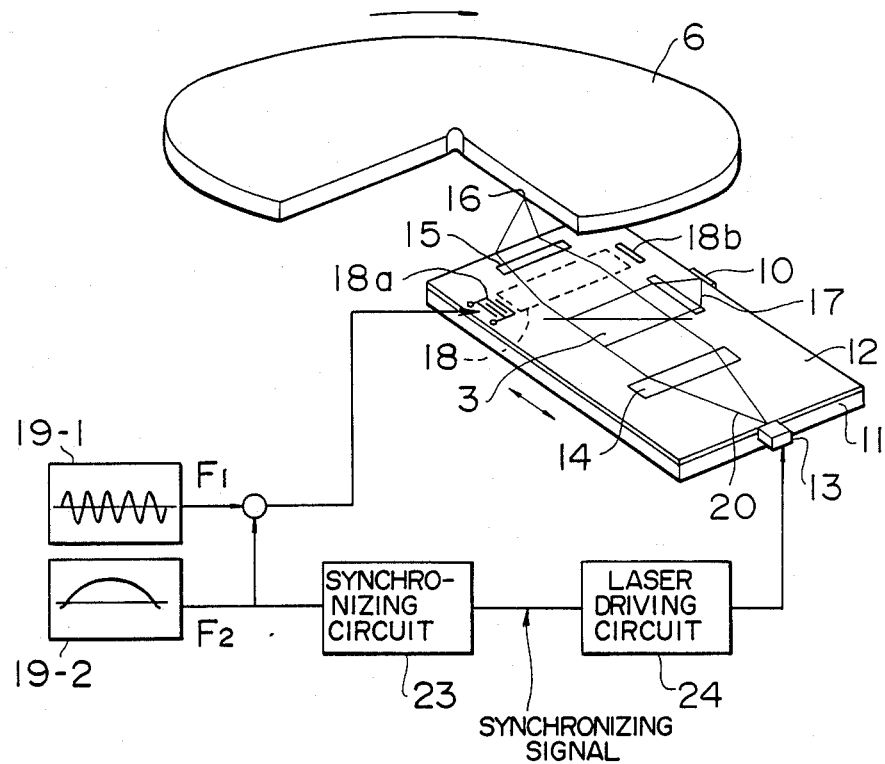
FIGS. 9a, 9b and 9c illustrate other embodiments.
Figure 9B:
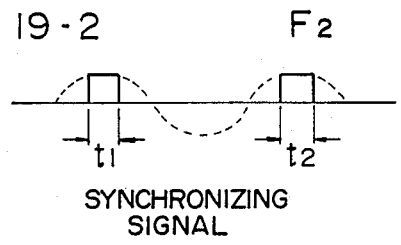
Figure 9C:
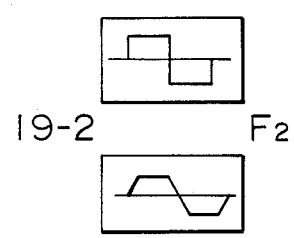

Further, since the standing wave varies every moment, the ultra-sonic wave $F_2$ for the focal point regulation can be more efficiently utilized, if it is used only in the period of time where a predetermined focusing state appears, as indicated in FIGS. 9a and 9b. That is, the semiconductor laser 13 is driven by laser driving circuit 24 only in periods of time $t_1, t_2, ---$, as indicated in FIG. 9b, by means of a synchronizing circuit 23. Furthermore, for the signal for the focusing regulation, a rectangular or trapezoidal wave, as indicated in FIG. 9c, may be used so that its flat portion drives the semiconductor laser.

Figure 10:
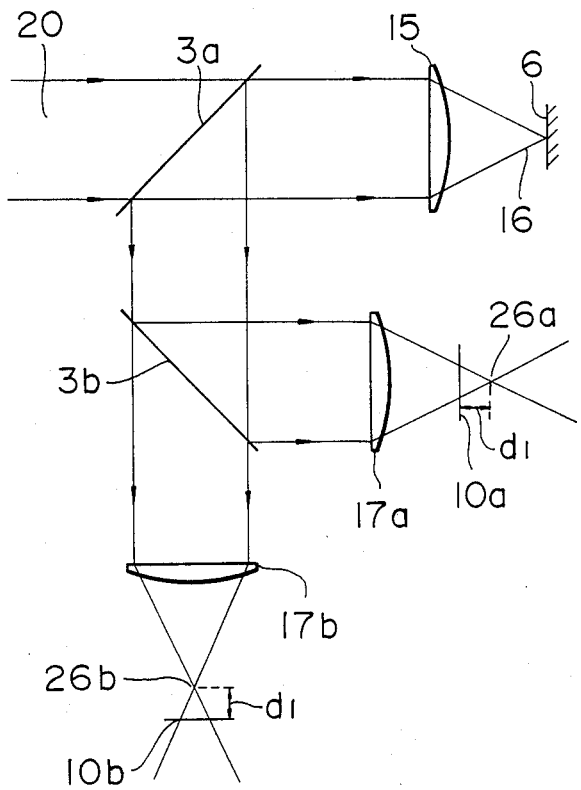
FIG. 10 is a diagram illustrating the optical system for focus error detecting means.

FIG. 10 shows an optical system using a photosensor 10 for the focus detection. In the case where the optical wave guide 12 is used, it is difficult to arrange a 3-dimensional optical system and thus it is impossible to construct an astigmatism type focus detection method, which is widely utilized in the optical disk system. By the optical system indicated in FIG. 10 the detection method is realized with a plane arrangement. A parallel laser light beam 20 passes through the objective lens 15 and formes the light spot on the optical disk 6. Further light reflected by the optical disk 6 passes again through the objective lens 15, is reflected at the right angle by the beam splitter 3a, and divided into two portions by another beam splitter 3b, one of them going straight on and the other being reflected at the right angle. The divided light beams pass through two lenses 17a and 17b, respectively, having a same focal length and are focused on photo sensors 10a and 10b. At this time, if the photosensors 10a and 10b are so located that one of them is at a distance $d_1$ before the correct focal point 26a and the other is at the distance $d_1$ behind the correct focal point 26b, it is possible to detect deviations of the focal point by measuring variations in the light intensity supplied to each of the photosensors 10a and 10b.

Figure 11:
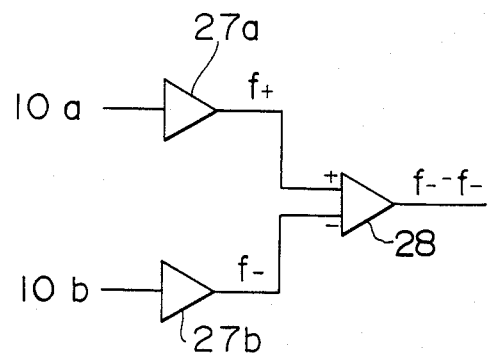
FIG. 11 is a circuit diagram of the focus error detecting means.
Figure 12:
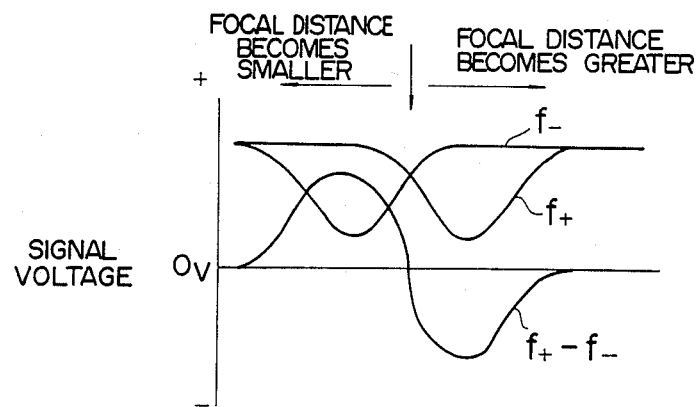
FIG. 12 is a graph showing variations in the signal voltage in the focus error detecting means.

FIG. 11 shows a circuit for processing signals coming from the photosensors 10a and 10b. The signals coming from the photosensours 10a and 10b are amplified by amplifiers 27a and 27b, respectively, and the difference therebetween is formed by an operational amplifier 28 so as to obtain a difference signal $f^+ - f^-$. FIG. 12 is a graph showing the relation between the voltage of each of the signals and the position of the photosensors 10a and 10b described above. As it can be understood from this figure, it is possible to find the correctly focused position by regulating the surface acoustic wave devices so that the difference signal $f^+ - f^-$ is 0 Volt.

As explained above, according to this invention, since a lens, whose focal distance can be varied by signals given from the exterior, is mounted on an optical head using a thin film optical wave guide, a focusing and tracking actuator for laser light without any mechanical operation can be constructed, and thus it is possible to make the optical head smaller, lighter and more reliable.

What is claimed is:

1. An optical head for focusing and projecting a laser light beam, adapted to focus a laser light sport on an optical recording medium for recording, reproducing and erasing information, comprising:

an optical wave guide being formed of a material which is capable of establishing variations in refractive index by a surface acoustic wave, and said optical wave guide being provided with an optical system including a collimator lens and an objective lens;

a laser light source disposed at one of the end surfaces of said optical wave guide for emitting a laser light beam so that light emitted by said laser light source is adapted to be directed in the form of a light beam to said optical recording medium; and electro-acoustic transducer means disposed between said beam splitter and said objective lens, said transducer mans being adapted to be driven by ultra-sonic vibration for producing a standing wave of an ultrasonic surface acoustic wave corresponding to a half period of a sine curve, said standing wave extending across a path of said light beam in said optical wave guide thereby giving rise to a form of the half period of a sine curve representative of the variations in refractive index in said optical wave guide, and providing a function of a lens for the light beam passing therethrough with a variable focal position controlled by varying the amplitude of said ultra-sonic vibration.

2. An optical head according to claim 1, further comprising a circuit for synchronizing the drive of said transducer by ultra-sonic vibration and the light emitted by said laser light source, wherein the light is emitted by said laser light only when the variations in the refractive index in said optical wave guide are in a predetermined form.

3. An optical head for focusing and projecting a laser light beam, adapted to focus a laser light sport on an optical recording medium for recording, reproducing and erasing information, comprising:
an optical wave guide being formed of a material which is capable of establishing variations in refractive index by a surface acoustic wave, and the optical wave guide being provided with an optical system including a collimator lens and an objective lens;
a laser light source disposed at one of the end surfaces of said optical wave guide for emitting a laser light beam so that light emitted by said laser light source is adapted to be directed in the form of a light beam to said optical recording medium;
a first electro-acoustic transducer means disposed between said beam splitter and said objective lens, said transducer means being adapted to be driven by a first ultra-sonic vibration for producing a standing wave of an ultra-sonic surface acoustic wave corresponding to a half period of a since curve, said standing waves extending across a path of said light beam formed in said optical wave guide thereby giving rise to a form of the half period of a since curve representative of the variations in refractive index in said optical wave guide and providing a function of a lens for the light beam passing therethrough with a variable focal position controlled by varying the amplitude of said ultra-sonic vibration; and
a second electro-acoustic transducer means disposed between said beam splitter and said objective lens, said transducer means being adapted to be driven by a second ultra-sonic vibration for producing ultra-sonic surface acoustic waves across a path of said light beam formed in said optical wave guide, said surface acoustic waves giving rise to a form of grating-pattern distribution in refractive index in said optical wave guide, thereby giving a function of diffracting grating for the light beam passing therethrough, whereby the direction of transmission of said light beam is capable of being varied by varying the frequency of said second ultra-sonic vibration.

4. An optical head according to claim 3, wherein said grating-pattern distribution in refractive index is formed by said standing wave.

5. An optical head according to claim 3, wherein said grating-pattern distribution in refractive index is formed by a travelling wave of said ultra-sonic surface acoustic wave.

6. An optical head according to claim 3, further comprising circuit means for synchronizing the drive of said transducer by ultra-sonic vibration and the light emitted by said laser light source, wherein the light is emitted by said laser light only when the distribution in refractive index in said optical wave guide is in a predetermined form.

7. An optical head for focusing and projecting a laser light beam, adapted to focus a laser light spot on a light recording medium for recording, reproducing and erasing information, comprising:
an optical wave guide having at least one end surface, said optical wave guide being formed of a material which is capable of establishing variations in refractive index by a surface acoustic wave, and said optical wave guide being provided with an optical system including a collimator leans and an objective lens;
a laser light source disposed at one of the end surfaces of said optical wave guide for emitting a laser light beam so that light emitted by said laser light source is adapted to be directed in the form of a light beam to said optical recording medium; and
electro-acoustic transducer means disposed between said beam splitter and said objective lens,
said transducer means being adapted to be driven by a first ultra-sonic vibration for producing a standing wave of an ultra-sonic surface acoustic wave corresponding to a half period of a sine curve, said standing wave extending across a path of said light beam formed in said optical wave guide thereby giving rise to a form of the half period of a since curve representation of variations in refractive index in said optical wave guide and providing a function of a lens for the light beam passing therethrough with a variable focal position controlled by varying the amplitude of said ultra-sonic vibration, and
said transducer means being adapted to be driven by a second ultra-sonic vibration for producing ultra-sonic surface acoustic wave across a path of said light beam formed in said optical wave guide, said acoustic waves giving rise to form a grating-pattern distribution in refractive index in said optical wave guide, thereby giving a function of diffracting grating for the light beam passing therethrough, whereby the direction of transmission of said light beam is capable of being varied by varying the frequency of said second ultra-sonic vibration.

8. An optical head according to claim 7, wherein said optical wave guide producing the distribution in refractive index is formed of a material having a piezo-electric effect and said electro-acoustic transducer is constituted by interdigital electrodes.

9. An optical head according to claim 7, wherein said optical wave guide producing distribution in refractive index is formed of a material having no piezo-electric effect and said electro-acoustic transducer is constituted by interdigital electrodes and a material which itself vibrates.

10. An optical head according to claim 7, further comprising circuit means for synchronizing the drive of said transducer by ultra-sonic vibration and the light emitted by said laser light source, wherein the light is emitted by said laser light only when the distribution in refractive index in said optical wave guide are in a predetermined form.

11. Optical means, comprising:
an optical wave guide, said optical wave guide being formed of a material which is capable of establishing a variations in refractive index by a surface acoustic wave;

electro-acoustic transducer means located to produce a surface acoustic wave which traverses an optical path in said optical wave guide;

ultra-sonic wave generator driving said electro-acoustic transducer means, said transducer means being adapted to be driven by ultra-sonic vibration for producing a standing wave of an ultra-sonic surface acoustic wave corresponding to a half period of a sine curve said standing wave extending across said optical path in said optical wave guide thereby giving rise to a form of the hald period of a sine wave representative of the variations in refractive index in said optical wave guide, the distribution acting on the light beam passing therethrough as a lens with a variable focal position controlled by varying the amplitude of said ultra-sonic vibration.

* * * * *